US012018604B2

(12) United States Patent
Rossi

(10) Patent No.: US 12,018,604 B2
(45) Date of Patent: Jun. 25, 2024

(54) SYSTEM FOR EXHAUST GAS PURIFICATION OF INTERNAL COMBUSTION ENGINES

(71) Applicant: RHAPIS S.R.L, Collazzone (IT)

(72) Inventor: Giulio Rossi, Collazzone (IT)

(73) Assignee: RHAPIS S.R.L., Collazzone (IT)

( * ) Notice: Subject to any disclaimer, the term of this patent is extended or adjusted under 35 U.S.C. 154(b) by 0 days.

(21) Appl. No.: 17/914,994

(22) PCT Filed: Mar. 31, 2021

(86) PCT No.: PCT/IB2021/052681
§ 371 (c)(1),
(2) Date: Sep. 27, 2022

(87) PCT Pub. No.: WO2021/198943
PCT Pub. Date: Oct. 7, 2021

(65) Prior Publication Data
US 2023/0151747 A1 May 18, 2023

(30) Foreign Application Priority Data
Mar. 31, 2020 (IT) .................... 102020000006682

(51) Int. Cl.
*F01N 3/00* (2006.01)
*B01D 45/14* (2006.01)
(Continued)

(52) U.S. Cl.
CPC ............ *F01N 3/005* (2013.01); *B01D 45/14* (2013.01); *B01D 47/06* (2013.01); *B01D 53/02* (2013.01);
(Continued)

(58) Field of Classification Search
CPC ........ F01N 3/005; F01N 3/0205; F01N 3/037; F01N 3/043; F01N 3/2066; F01N 3/02;
(Continued)

(56) References Cited

U.S. PATENT DOCUMENTS

2004/0226442 A1* 11/2004 Olsson .................... B60T 17/02
95/270
2007/0278795 A1* 12/2007 Berkson ................... B60K 6/48
290/40 C (Continued)

FOREIGN PATENT DOCUMENTS

CN 105822387 B 8/2016
DE 3002871 A1 7/1981
(Continued)

OTHER PUBLICATIONS

International search report and written opinion issued by the EPO on Jun. 14, 2021 for PCT/IB2021/052681.

Primary Examiner — Brandon D Lee

(57) ABSTRACT

System (1) for the purification of exhaust gases (S) of an endothermic engine (100), comprising at least one duct (2) for exhausting the gases produced by said endothermic engine, means (3) for cooling said exhaust gases which cross said duct (2) so that to cause, at least in part, the condensation of the water vapor contained in said exhaust gases in water (AC), and means (4) for separating the condensed water (AC), which is condensed by said cooling means along the exhaust duct, from the exhaust gases and for deviating it along a secondary duct (10), said system being characterized by further comprising filtering means (5), which are arranged downstream of said separating means (4) along said secondary duct (10), for filtering said condensed and separated water (AC).

18 Claims, 2 Drawing Sheets

(51) Int. Cl.
| | |
|---|---|
| *B01D 47/06* | (2006.01) |
| *B01D 53/02* | (2006.01) |
| *B01D 53/26* | (2006.01) |
| *B60H 1/00* | (2006.01) |
| *C02F 1/00* | (2023.01) |
| *C02F 1/28* | (2023.01) |
| *C02F 1/42* | (2023.01) |
| *C02F 103/18* | (2006.01) |
| *F01N 3/02* | (2006.01) |
| *F01N 3/037* | (2006.01) |
| *F01N 3/04* | (2006.01) |
| *F01N 3/20* | (2006.01) |

(52) U.S. Cl.
CPC ....... *B01D 53/265* (2013.01); *B60H 1/00478* (2013.01); *C02F 1/283* (2013.01); *C02F 1/42* (2013.01); *F01N 3/0205* (2013.01); *F01N 3/037* (2013.01); *F01N 3/043* (2013.01); *F01N 3/2066* (2013.01); *B01D 2253/102* (2013.01); *B01D 2259/4566* (2013.01); *C02F 2001/007* (2013.01); *C02F 2001/425* (2013.01); *C02F 2103/18* (2013.01); *F01N 3/02* (2013.01); *F01N 2610/1406* (2013.01); *F01N 2610/1426* (2013.01)

(58) Field of Classification Search
CPC ..... F01N 2610/1406; F01N 2610/1426; F01N 2610/1453; F01N 3/029; F01N 2240/22; F01N 2570/22; B01D 45/14; B01D 47/06; B01D 53/02; B01D 53/265; B01D 2253/102; B01D 2259/4566; B60H 1/00478; C02F 1/283; C02F 1/42; C02F 2001/007; C02F 2001/425; C02F 2103/18; F01P 2060/16; F01P 3/12; F01P 3/20

See application file for complete search history.

(56) References Cited

U.S. PATENT DOCUMENTS

| | | | |
|---|---|---|---|
| 2015/0219002 A1* | 8/2015 | Hayase | F01P 7/165 |
| | | | 123/41.31 |
| 2019/0017422 A1* | 1/2019 | Bradford | F01N 13/08 |
| 2019/0232219 A1* | 8/2019 | Jakop | F24F 3/1429 |
| 2020/0116072 A1* | 4/2020 | Toyama | F16K 11/072 |
| 2020/0316519 A1* | 10/2020 | Pess | C02F 9/00 |
| 2020/0348033 A1* | 11/2020 | Krüger | F24F 8/10 |
| 2021/0003103 A1* | 1/2021 | Singh | F02M 26/36 |

FOREIGN PATENT DOCUMENTS

| | | |
|---|---|---|
| GB | 2332631 A | 6/1999 |
| WO | 2008150839 A1 | 12/2008 |
| WO | 2019196969 A1 | 10/2019 |
| WO | 2020049184 A1 | 3/2020 |

* cited by examiner

SYSTEM FOR EXHAUST GAS PURIFICATION OF INTERNAL COMBUSTION ENGINES

This application is a U.S. national stage of PCT/IB2021/052681 filed on 31 Mar. 2021, which claims priority to and the benefit of Italian Patent Application No. 102020000006682, filed 31 Mar. 2020 the contents of which are incorporated herein by reference in their entireties.

FIELD OF THE INVENTION

The present invention concerns a system for exhaust gas purification of endothermic engines. In particular, such purification system is used in the motoring sector for endothermic engines powered both by liquid and gaseous fuels or combustibles, i.e. for supercharged and atmospheric Otto cycle and Diesel cycle engines with two and four strokes, with both carburetor and direct and indirect injection.

KNOWN PRIOR ART

According to known art, the systems for exhaust gas purification of an endothermic engine in use are not able to effectively purify the exhaust gases produced by the engine itself, thus releasing gaseous and solid substances that are highly toxic to the health into the air. The most renown purification systems are known under the acronyms DPF and FAP.

The diesel particulate filter (whether of the FAP or DPF type), inserted into the exhaust system and integrated with the catalyst or catalytic converter, consists of a monolithic support based on porous silicon carbide. This allows to reduce the size of the particulate matter particles emitted to less than one thousandth, also taking into account the particles of smaller sizes (<20 nm).

The diesel particulate filter is to be regarded as a real mechanical filter consisting of a series of channels on whose surfaces the particulate matter is trapped, while the exhaust gases cross its porous walls.

The diesel particulate filters are thus real "mechanical traps" where the powders are—in fact—"trapped". For this reason, these diesel particulate filters require periodic cleaning since the "trap" channels get obstructed with particulate matter. Such cleaning is named regeneration. The regeneration is a flame development which triggers a combustion process of the particulate matter inside the filter, i.e. the process of incinerating and reducing the size of particulate matter. On the average, such process occurs every 800/1000 kilometers and, in urban use, even at intervals of less than 300 kilometers. Two types of particulate filter systems are essentially used by engineers: FAP or DPF. These two types of filtering systems are different in terms of their structure and operation. The major difference essentially lies in the different regeneration strategy.

The particulate filter system named FAP (Filtres à Particules) belongs to the type of filters that use various additives based on cerium and/or iron oxides to be regenerated, whereas the particulate filter system named DPF (Diesel Particulate Filter) does not use additives. However, in both cases during the regeneration process, i.e. during the combustion of the particulate matter present in the filter, in particular in the post-combustion device, the exhaust gases can reach and exceed 550° C.

Such known filtering systems are thus not able to effectively purify the gases themselves, thus releasing gaseous and solid substances that are highly toxic to the health into the air, but even—following the combustion process—produce nanoparticles of particulate matter since further reduced in terms of size, with the consequence that such particles, further reduced in size, can easily reach the pulmonary alveoli of the respiratory tract, thus ending up in the blood and in all other internal organs of the individuals breathing them. In addition to this, there is the release of highly toxic water vapor (a source of acid rains among other things) into the atmosphere since mixed with other gaseous pollutants, such as, by way of example and without limitations, cerine (cerium oxide) which tends to lower the flash point of the particulate matter, or the urea (carbonic acid diamide) used by modern catalysts for the containment of Nox in an attempt to solve the problem of pollutants present in the exhaust gases of Diesel and Otto cycle engines.

Moreover, the fact that, by activating post-combustion functions of exhaust gases, such anti-pollution devices (FAP and/or DPF) produce significant increases in the operating temperatures of the combustion chambers, thus of the exhaust gases and the entire exhaust line which reach and exceed 550° just at the post-combustion device (FAP/DPF), in some cases causing the device and the entire machine to catch on fire and in any case a potential risk of the system and machine on which the device is installed to catch on fire, must be added.

Such known systems thus have the drawback of making particulate powders invisible and easily to inhale, using and vaporizing chemical substances in the environment, and amplifying the operating temperatures of the engine, exhaust line and surrounding environment.

Other systems for exhaust gas purification of known art or the like are known.

For example, the patent WO2019/196969, in the name of Werner Lohberg describes a catalytic converter for an internal combustion engine for recovering energy from the combustion of fuel and air, wherein the combustion gas being generated is conducted in a transit path through the catalytic converter along which a diffusion membrane resistant to high temperatures is fixed and which in turn borders a gas recovery collector which is kept at a lower pressure with respect to a respective internal pressure of the catalytic converter and any gas recovered and collected from the combustion gas, is restored to the combustion chamber of the engine (M) to lower its operating temperature and thus the formation of further NOx. A swirl chamber is inserted in the transit path and is adjacent to the diffusion membrane. The internal pressure of the catalytic converter is higher in the swirl chamber as a result of the obstacles for the combustion gases. The water is added to the combustion gas in the transit path upstream of the swirl chamber, in a ratio according to the fuel burned. The water is recovered by cooling the exhaust gases along the exhaust line of the engine.

The patent DE3002871, in the name of BRUNN GMBH describes a method of purifying the exhaust gases from an internal combustion engine, such as a diesel engine, by cooling the exhaust gases below their dew point and, thus, by separating the liquid produced and the solid particles contained in the exhaust gases. The equipment for carrying out the method comprises an exhaust duct having a cooling surface connected to a cooling circuit of, for example, a refrigerator, and a liquid separator having absorption agents that are used to further separate the solid particles.

The patent WO2020/049184, in the name of INSTRACTION GMBH, instead concerns a device for purifying drinking water—not exhaust gases of endothermic engines—in more steps by combining purifying technologies into a module.

Object of the present invention is thus to implement a system for purifying exhaust gases of endothermic engines which has less use risks, in particular, which does not involve fire risks for the car on which it is installed.

Further object of the present invention is to implement a purification system which is more efficient than known ones and which thus leads to an abatement of the pollutants emitted by endothermic engines with considerable benefits for the health of people.

Moreover, object of the present invention is to implement a purification system which can simply be applied also on cars currently in circulation, thus without needing to install it during the production step of the car.

SUMMARY OF THE INVENTION

These and further objects are reached by means of a system for the purification of exhaust gases of an endothermic engine, comprising at least one duct for exhausting the gases produced by said endothermic engine, cooling means for cooling said exhaust gases which cross said duct so that to cause, at least in part, the condensation of the water vapor contained in said exhaust gases in water at least at one area of said exhaust duct, and means for separating the condensed water, which is condensed by said cooling means along the exhaust duct, from the exhaust gases and for deviating it along a secondary duct, said system being characterized by further comprising filtering means, which are arranged downstream of said separating means along said secondary duct, for filtering said condensed and separated water.

Such solution allows to recover a high amount of polluting powders present in exhaust gases and of CO and/or $CO_2$ which dissolves in water and which remains trapped in the water itself following the separation obtained by the separating means. The filtering means are then able to fully purify the condensed and separated water, thus eliminating, following the separation, both the polluting powders that had remained in the condensed water and the polluting gases, which dissolve in the water.

According to the invention, the purification system further comprises injecting means for injecting purified water into said exhaust duct, upstream of said cooling means, wherein said injecting means inject said purified water obtained from said injecting means at the inlet of said at least one area of said exhaust duct.

Such solution allows to exploit at least part of the purified water to carry out an injection and consequent nebulization of the purified water into the exhaust duct, upstream of the area of the exhaust duct where the cooling means operate. The injection of perfectly purified water not only allows to favor the cooling of exhaust gases but also facilitates the "capture" of inert particles (or polluting powders) present in exhaust gases and in gases soluble in the water itself, such as CO and $CO_2$, thanks to the nebulization of the purified water.

Moreover, said cooling means comprise a closed circuit inside which a refrigerant fluid circulates, preferably but not limitedly the R1234YF mixture; said closed circuit comprises at least one first heat exchange length, arranged at said area, for exchanging heat with said exhaust duct so that to directly or indirectly cause, at least in part, the condensation of the water vapor contained in said exhaust gases.

Moreover, said cooling means comprise, along said closed circuit, a compressor and a gas expansion valve, wherein said compressor is downstream of said first heat exchange length and said expansion valve is upstream of said at least one first heat exchange length.

Moreover said separating means comprise at least one centrifuge, preferably of the conical type and, even more preferably of the two-stage type.

According to a preferred embodiment of the invention, the system comprises one or more collection tanks for collecting the condensed and separated water, which are functionally arranged downstream of said separating means along said secondary duct, between said separating means and said filtering means of said condensed and separated water.

Moreover, said filtering means for filtering said condensed and separated water comprise at least one activated carbon filter and/or at least one filter containing cationic resin and/or at least one sedimentation filter.

Such activated carbon filter and/or such filter containing cationic resin and/or such sedimentation filter can be replaced after a predetermined number of kilometers traveled by the car on which the purification system is installed. In practice, by simply replacing the activated carbon filter and/or the filter containing the cationic resin and/or a sedimentation filter, it is possible to provide to the regular maintenance of the purification device.

Moreover, according to a preferred embodiment of the invention, said injecting means comprise at least one connection duct for directly or indirectly connecting said filtering means to said exhaust duct, at least one injector arranged upstream of said area of said exhaust duct, and at least one pump for supplying the purified water to said at least one injector.

Moreover, at least one collection tank for collecting from said filtering means said purified water used by said injecting means, is functionally arranged between said injecting means and said filtering means.

Always according to the invention, said separating means are adapted to direct said exhaust gases devoid at least in part of said condensed water, along an end length of said exhaust duct. Advantageously, said system comprises at least one filtering device comprising at least one impregnated activated carbon filter and/or at least one absolute filter of the HEPA type, preferably of the H14 type or higher, arranged along said end length of said exhaust duct, downstream of said separating means.

Moreover, said cooling means further comprise a condenser arranged along at least one second heat exchange length of said closed circuit; said condenser comprising immersion radiator cores and said second heat exchange length crosses a hermetic container containing a first coolant. Advantageously, said first refrigerant liquid comprises a water and glycol mixture.

The invention also provides a transport vehicle comprising an endothermic engine, a system for purifying the exhaust gases coming from said endothermic engine according to one or more of claims 1 to 12, and a cooling system for cooling said endothermic engine, advantageously said cooling system comprises a closed circuit, a pump arranged along said closed circuit for circulating a second refrigerant and immersion radiator cores arranged inside said hermetic container.

Said second refrigerant liquid advantageously comprises a water and glycol mixture. Moreover, the transport vehicle comprises a heat exchange system for cooling said refrigerant fluid and said second refrigerant liquid; said heat exchange system comprises a closed circuit inside which said first refrigerant liquid circulates, a pump for circulating said first refrigerant liquid, a refrigeration device for said first refrigerant liquid and said hermetic container. Advantageously, said heat exchange system comprises a portion for the exchange of heat with said exhaust gases and with said first heat exchange length of said refrigeration means.

Preferably, said refrigeration device comprises at least one Peltier cell.

Finally, said vehicle comprises an air conditioning device inside the passenger compartment, said cooling means of said purification system being functionally connected to said air conditioning device.

DESCRIPTION OF THE FIGURES

These and further aspects of the present invention will become clearer in the following detailed description of a preferred embodiment provided herein by way of example only and without limitations, with reference to the accompanying figures, in which.

DETAILED DESCRIPTION OF A PREFERRED EMBODIMENT OF THE PRESENT INVENTION

With particular reference to such FIGS., 1 denotes the system for exhaust gas purification according to the present invention.

Figure 1:
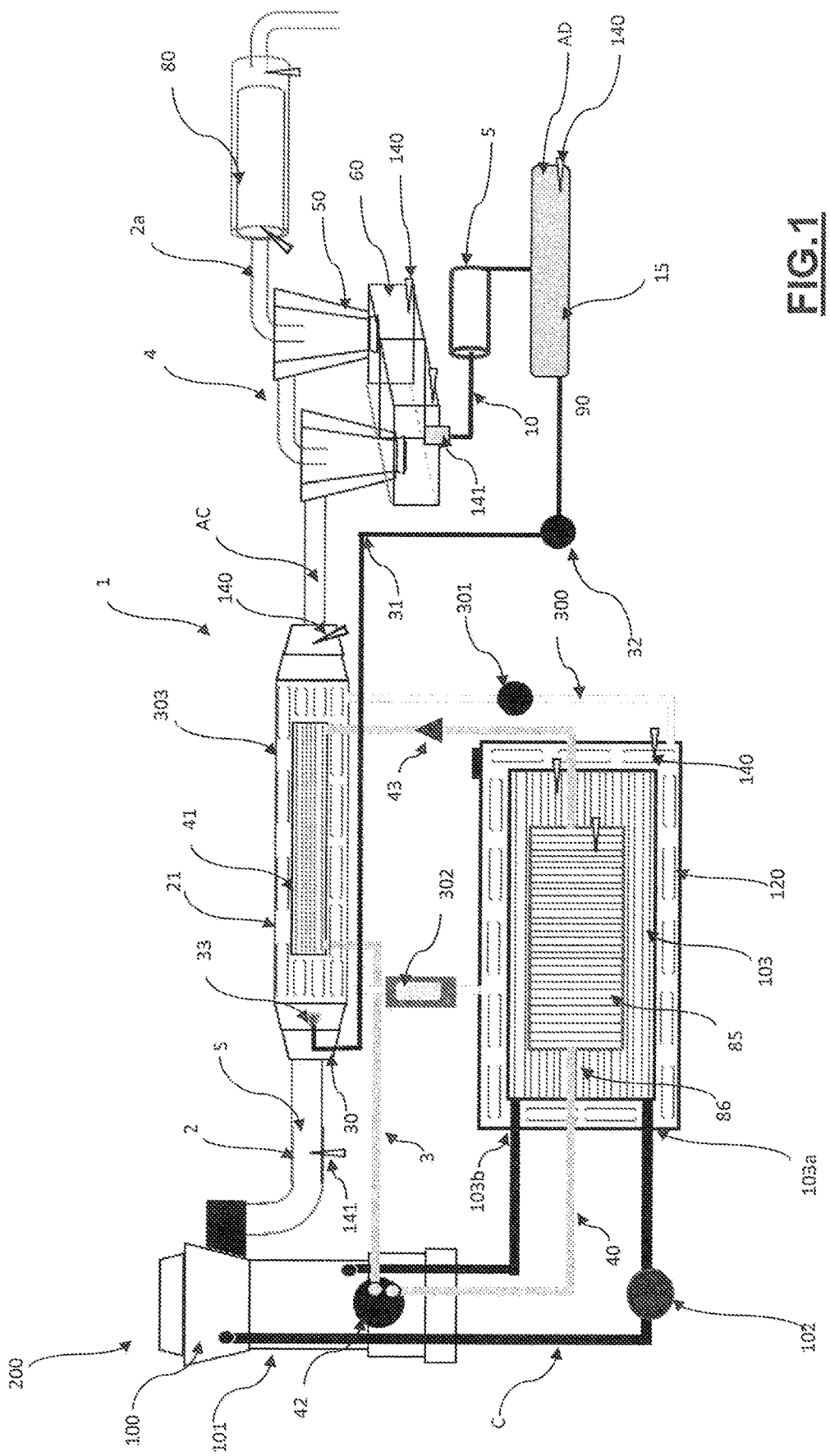
FIG. 1 is a schematic view of the system for exhaust gas purification according to the invention, operating in combination with an endothermic engine of a transport vehicle.

In an extremely simplified way, some essential components present inside a generic transport vehicle 200 are shown in FIG. 1 for understanding the solution suggested in the present patent application. The transport vehicle 200 can be of the road or special type, already registered and/or in circulation, and of any size and type. By way of example and without limitations, the vehicle 200 could also be for rail transport and/or anyhow for any vehicle in which an endothermic engine is used.

The vehicle 200 comprises an endothermic engine 100 of the Diesel cycle type and a purification system 1 for the exhaust gases (or exhausted gases) coming from the endothermic engine 100.

It should be observed that an endothermic engine of the Otto type would anyhow fall within the protection scope of the present invention.

The purification system 1 for the exhaust gases S of the endothermic engine 100 comprises a duct 2 for exhausting the gases produced by the endothermic engine 100 and means 3 for cooling the exhaust gases S which cross the duct 2 so that to cause, at least in part, the condensation of the water vapor contained in the exhaust gases in condensed water AC at one area 21 of the exhaust duct 2, and means 4 for separating the condensed water AC, condensed by the cooling means 3 along the exhaust duct 2, from the exhaust gases S and for deviating it along a secondary duct 10.

The purification system 1 further comprises filtering means 5, which are arranged downstream of said separating means 4 along the secondary duct 10, for filtering the condensed and separated water AC.

In this case, the separating means 4 comprise a two-stage centrifuge 50 of the conical type. In another embodiment not shown herein, such separating means 4 can comprise a single-stage centrifuge of the conical type, or a single-stage centrifuge not of the conical type, anyhow falling within the protection scope of the present invention.

Such solution thus allows to filter the water present in the exhaust gas S of the combustion engine 100 from impurities. More precisely, the purified water AD recovered by the effect of the reconversion of the water vapor present in the exhaust gases S is centrifuged in the conical two-stage centrifuges, thus forcing all polluting particles to mix with the water itself. Said mixing produces an increase in the weight and volume of all solid particles and the dissolution of the gaseous ones, thus eliminating the possibility to reintroduce them into the air. Such inert particles are then restrained by the filtering means 5, thus generating a completely purified water AD.

Moreover, the purification system 1 comprises means 30 for injecting the purified water AD into the exhaust duct 2 from the filtering means 5. Such injecting means 3 are able to inject and thus to nebulize the purified water AD, at the aforementioned area 21 of the exhaust duct 2. In particular, said injecting means inject the purified water AD upstream of the area 21 of the exhaust duct 2.

Such solution thus allows to filter the water present in the exhaust gas S of the combustion engine 100 from impurities and to use it, once purified, to capture further impurities present in the polluting exhaust gas S. More precisely, the purified water AD recovered by the effect of the conversion of the water vapor is mixed with the exhaust gases S and centrifuged in the conical two-stage centrifuge, thus forcing all the polluting particles to mix with the water itself. Moreover, the injection of water also allows to favor the cooling of the exhaust gases and the "capture" of gaseous and/or inert particles (or polluting powders) present in exhaust gases is favored, thanks to the nebulization of the purified water.

According to the embodiment described herein, said cooling means 3 comprise a closed circuit 40 inside which a refrigerant fluid, such as for example the R1234YF mixture, circulates. In further embodiments, such refrigerant fluid can also be different from the R1234YF mixture, without thereby departing from the protection scope of the present invention. The closed circuit 40 comprises a first heat exchange length 41 for exchanging heat with the exhaust duct 2 arranged at the area 21 of the exhaust duct 2, so that to cause, at least in part, the condensation of the water vapor contained in said exhaust gases S. Such heat exchange length can be in direct or indirect contact with the exhaust gas S. In practice, the heat exchange length 41 can comprise a plurality of ducts inside which the refrigerant fluid flows. In the embodiment described herein, the ducts are not in direct contact with the exhaust gases, but a further carrier liquid is cooled along said first heat exchange length 41 which in turn causes the cooling of the exhaust gases crossing the area 21 of the exhaust duct 2. In a further embodiment of the invention, such ducts of the first heat exchange length 41 can also be in direct contact with the exhaust gases S.

Moreover, the cooling means 3 comprise, along the closed circuit 40, a compressor 42 and a gas expansion valve 43, wherein the compressor 42 is downstream of the heat exchange length 41 and the expansion valve 43 is upstream of the heat exchange length 41.

As shown in FIG. 1, the purification system 1 comprises two collection tanks 60 for collecting the condensed and separated water AC, which are functionally arranged along the secondary duct 10 between the separating means 4 and the filtering means 5 of the condensed water. Such collection tanks 60 are in the initial portion of such secondary duct 10.

The number of collection tanks 60 of the condensed and centrifuged waters depends, in this case, on the fact that there is a least one two-stage centrifuge 50, in further embodiments the number of collection tanks 60 of the condensed water could also be of a single unit without thereby departing from the protection scope of the present invention.

According to the embodiment described herein, said filtering means 5 for filtering the condensed and separated water comprise an activated carbon filter, a filter containing cationic resin and/or a sedimentation filter. Such filters can be replaced at the exceeding of a predetermined number of kilometers traveled by the car or of operating hours of the machine on which the purification system 1 is installed.

It should be observed that, although the filtering means 5 described herein comprise at least one activated carbon filter, at least one filter containing cationic resin and at least one sedimentation filter, in other embodiments the filtering means 5 can anyhow contain also only one activated carbon filter or also only one cationic resin filter or also only one sedimentation filter, or a combination of only two of such filters, without thereby departing from the protection scope of the present invention.

According to the embodiment shown in FIG. 1, such injecting means 30 comprise a connection duct 31 for directly or indirectly connecting the filtering means 5 to the exhaust duct 2, an injector 33 arranged upstream of the area 21 of the exhaust duct 2, i.e. upstream of the first heat exchange length 41 of the cooling means 3, and a pump 32 for supplying the purified water AD to the injector 33.

According to the embodiment shown, a collection tank 15 for collecting the purified water AD from the filtering means 5 and used by the injecting means 30 is comprised between the injecting means 30 and the filtering means 5.

The injection of purified water AD and its consequent nebulization, allows to bring forward the cooling of the exhaust gases 41 and to simultaneously capture, at least initially, part of the fine inert and polluting powders contained in the exhaust gas S, also together with part of the gases which can be dissolved in water, such as $CO_2$ and CO.

The excess purified water AD present in the collection container 15 can be eliminated through an outlet port (not shown herein) which can be opened at the exceeding of a predetermined level of purified water AD reached in the container 15, as occurs for the condense of the air conditioning systems.

Always as shown in FIG. 1, the separating means 4 are adapted to direct the exhaust gases S devoid at least in part of the condensed water AC, along an end length 2a of the exhaust duct 2. Moreover, the system 1 comprises a filtering device 80 in turn comprising an impregnated activated carbon filter and an absolute filter of the HEPA H14 type or higher, which are arranged in series along the end length 2a of the exhaust duct 2, downstream of the separating means 4. In further embodiments, the filtering device 80 can also comprise only the impregnated activated carbon filter or also only an absolute filter of the HEPA H14 type or higher, without thereby departing from the protection scope of the present invention.

It should be observed that the HEPA filter and the activated carbon filter are positionable along the end length 2a of the exhaust duct 2 since the exhaust gases S reach such section 2a at a temperature of less than 60° C., i.e. at a temperature not greater than that to which the filters can resist.

Always according to the embodiment described herein, the cooling means 3 further comprise a condenser 85 arranged along at least one second heat exchange length 86 of the closed circuit 40. Such condenser 85 comprises first immersion radiator cores, whereas said second section 86 crosses a hermetic container 120 containing a first refrigerant liquid. Thus, the condenser 85 is immersed inside the container 120. Such first refrigerant liquid comprises water and glycol.

Figure 2:
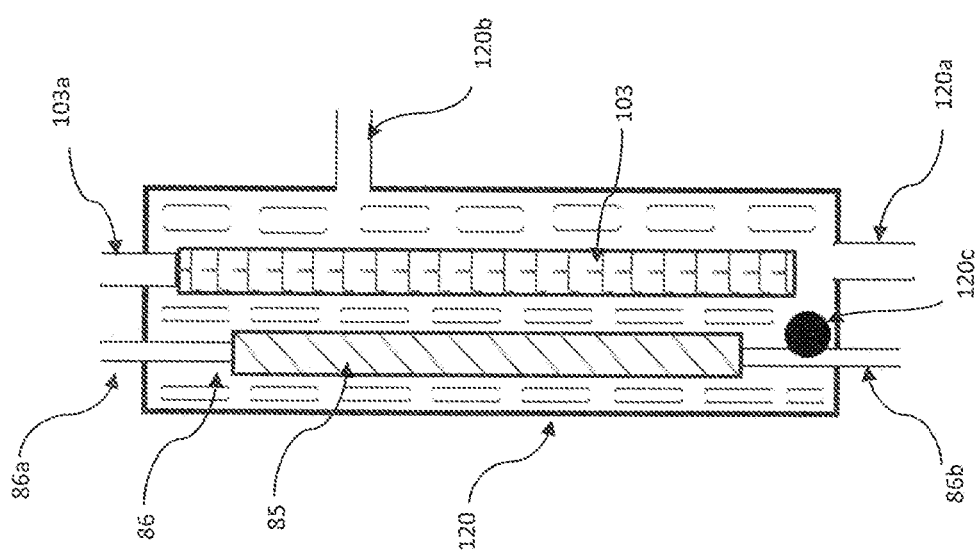
FIG. 2 is a schematic view of the hermetic container for cooling the refrigerant fluid of the cooling means of the exhaust gas and the refrigerant liquid of the cooling means of the endothermic engine.

The second heat exchange length 86 of the cooling means 3 and the condenser 85, both immersed inside the hermetic container 120, are shown in FIG. 2. It is possible to see how such second heat exchange length 86 crosses the container 120 and comprises an inlet section 86a and an outlet section 86b. The refrigerant fluid circulating in the circuit 40 enters the section 86a, pushed by the compressor 42 and then, once condensed, comes out of the section 86b to reach the expansion valve 43 to then reach the evaporator 41, i.e. the first heat exchange length.

The invention also concerns a vehicle 200 which comprises, in addition to comprising an endothermic engine 100 and a system 1 for purifying the exhaust gases 1 coming from the endothermic engine 100 as described above and anyhow according to one or more of claims 1 to 12, a cooling system 101 for the endothermic engine 100. Such cooling system 101 comprises a closed circuit C, a pump 102 arranged along the closed circuit C for circulating a second refrigerant liquid, such as for example water and glycol or other refrigerant liquid in further embodiments, and radiator cores by immersion 103 arranged inside the hermetic container 120.

Still in FIG. 2, the radiator cores 103 arranged inside the hermetic container 120 are shown. It is possible to see how such radiator cores 103 have an inlet section 103a of the refrigerant fluid (the outlet section 103b is visible in FIG. 1) and an outlet section 103b. The refrigerant fluid circulating in the circuit C enters from the section 103a, pushed by the pump 102 and then comes out of the outlet section 103b to reach the combustion engine 100 and cause its cooling.

Always as shown in FIGS. 1 and 2, the vehicle 200 further comprises a heat exchange system for cooling the refrigerant fluid and the second refrigerant liquid. Such heat exchange system comprises a closed circuit 300 inside which the first refrigerant liquid circulates, a circulation pump 301 for the first refrigerant liquid, a refrigeration device 302 for the first refrigerant liquid and the aforementioned hermetic container 120 inside which both the first radiator cores 86 and the second radiator cores 103 are present. Such hermetic container 120 has an inlet section 120a of the first refrigerant liquid and an outlet section 120b of the first refrigerant liquid, together with a cap 120c for inspecting and filling the closed circuit 300. The circulation is continuous inside the closed circuit 300 and the refrigeration of such fluid is ensured by the refrigeration means 3 and, in the event of excessively high ambient temperatures, also by means of the refrigeration device 302 which considerably increases the refrigeration capacity of the system. The heat exchange system further comprises a portion 303 for the exchange of heat with the exhaust gases S and with the first heat exchange length 41 of the refrigeration means 3. In particular, as mentioned above, the ducts of the plurality of ducts of the first heat exchange length 41 are contained inside a heat exchange portion 303, which is preferably cylindrical and filled with such first refrigerant liquid. Such cylindrical portion, which corresponds in size substantially to the area 21 of the exhaust duct 2, is crossed by a plurality of ducts inside which the exhaust gases S flow. In practice, such ducts inside which the exhaust gases S flow are immersed in the first refrigerant liquid which is in turn cooled by means of the first length 41 of the refrigeration means 3.

It should be observed that although up to here both the first refrigerant liquid and the second refrigerant liquid comprise a water and glycol mixture, the refrigerant liquid can be different for both one or the other refrigerant liquid in other embodiments, without thereby departing from the protection scope of the present invention.

According to a particular embodiment of the invention, the refrigeration device 302 of the heat exchange system for cooling the first refrigerant liquid and the refrigerant fluid comprises a plurality of Peltier cells.

Such Peltier cells are mainly operated during the warm season, when there is a need to increase the cooling of the area 21 of the exhaust duct 2. In fact, the cooling in the area 21 of the exhaust duct 2 is generally obtained by means of the compressor 42 of the cooling means 3, when the refrigerant fluid crosses the first heat exchange length 41 of the closed circuit 40.

It should be observed that in the embodiment described herein, the refrigeration device 302 is in one of the two branches of the circuit 300 which connect the hermetic container 120 to the portion 303 for the exchange of heat with the exhaust gases S and with the first heat exchange length 41 of the refrigeration means 3, in a further embodiment, however, the refrigeration device, i.e. one or more Peltier cells, can also be arranged on both the branches of the closed circuit 300 or on another branch of the closed circuit 300, without thereby departing from the protection scope of the present invention.

Finally, the vehicle 200 further comprises an air conditioning device present inside the passenger compartment of the vehicle itself. Advantageously, the cooling means 3 of the purification system 1 are functionally connected to the air conditioning device.

The car further comprises a series of temperature 140 and level 141 sensors adapted to ensure the perfect operations of both the purification system 1 and the vehicle 200.

Finally, it should be observed that the vehicle 200 comprises a control unit (not shown herein) which, depending on the signals coming from the aforementioned sensors 140 and 141, allows to change the speed of the compressor 42 and/or pumps 102 and 301 and, thus, the flow rate of the refrigerant fluid and of the first and second refrigerant liquids, so that the temperature of the exhaust gases at the outlet of the area 41 of the exhaust duct 2 is kept constant or, anyhow, fluctuating within a predetermined temperature range and which simultaneously ensures the proper cooling of the endothermic engine 100.

The invention claimed is:

1. A system (1) for the purification of exhaust gases (S) of an endothermic engine (100), comprising at least one exhaust duct (2) for exhausting the gases produced by said endothermic engine, means (3) for cooling said exhaust gases which cross said duct (2) so that to cause, at least in part, the condensation of the water vapor contained in said exhaust gases in water (AC) at least at one area (21) of said exhaust duct (2), and means (4) for separating the condensed water (AC), which is condensed by said cooling means along the exhaust duct (2), from the exhaust gases and for deviating it along a secondary duct (10), said system further comprising filtering means (5), which are arranged downstream of said separating means (4) along said secondary duct (10), for filtering said condensed and separated water (AC).

2. The system (1) according to claim 1, further comprising injecting means (30) for injecting said purified water (AD) into said exhaust duct (2), said injecting means injecting said purified water from said filtering means upstream of said at least one area (21) of said exhaust duct (2).

3. The system according to claim 1, wherein said cooling means (3) comprise a closed circuit (40) inside which a refrigerant fluid circulates, said closed circuit comprising at least one first heat exchange length (41) for exchanging heat with said exhaust duct (2) arranged at said area (21) of said exhaust duct.

4. The system according to claim 3, wherein said cooling means (3) comprise, along said closed circuit (40), a compressor (42) and a gas expansion valve (43), wherein said compressor is downstream of said at least one first heat exchange length (41) and said expansion valve is upstream of said at least one first heat exchange length (41).

5. The system according to claim 1, wherein said separating means (4) comprise at least one centrifuge (50).

6. The system according to claim 1, further comprising one or more collection tanks (60) for collecting the condensed and separated water (AC), which are functionally arranged downstream of said separating means (4) along said secondary duct (10), between said separating means (4) and said filtering means (5) of said condensed and separated water.

7. The system according to claim 1, wherein said filtering means (5) for filtering said condensed and separated water comprise at least one activated carbon filter and/or at least one filter containing cationic resin and/or at least one sedimentation filter.

8. The system according to claim 2, wherein said injecting means (30) comprise at least one connection duct (31) for directly or indirectly connecting said filtering means (5) to said exhaust duct (2), at least one injector (33) arranged upstream of said area (21) of said exhaust duct (2), and at least one pump (32) for supplying the purified water (AD) to said at least one injector (33).

9. The system according to claim 2, wherein at least one collection tank (15) for collecting from said filtering means said purified water (AD) used by said injecting means, is functionally arranged between said injecting means (30) and said filtering means (5).

10. The system according to claim 1, wherein said separating means (4) are adapted to direct said exhaust gases (S), at least in part devoid of said condensed water (AC), along an end length (2a) of said exhaust duct (2), and wherein they comprise a filtering device (80) comprising at least one impregnated activated carbon filter and/or at least one HEPA-type absolute filter arranged along said end length (2a) of said exhaust duct, downstream of said separating means (4).

11. The system according to claim 1, wherein said cooling means (3) further comprise a condenser (85) arranged along at least one second heat exchange length (86) of said closed circuit (40), said condenser (86) comprising immersion radiator cores and passing through a hermetic container (120) containing a first refrigerant liquid.

12. The system according to claim 11, wherein said first refrigerant liquid comprises a water and glycol mixture.

13. A transport vehicle (200) comprising an endothermic engine (100), a system (1) for purifying the exhaust gases coming from said endothermic engine (100) according to claim 1, and a cooling system (101) for cooling said endothermic engine, said cooling system (101) comprising a closed circuit (C), a pump (102) arranged along said closed circuit (C) for circulating a second refrigerant liquid, and immersion radiator cores (103) arranged inside said hermetic container (120).

14. A transport vehicle according to claim 13, further comprising a heat exchange system for cooling said refrigerant fluid and said second refrigerant liquid, said heat exchange system comprising a closed circuit (300) inside which said first refrigerant liquid circulates, a circulation pump (301) for circulating said first refrigerant liquid, a refrigeration device (302) for said first refrigerant liquid and said hermetic container (120), said heat exchange system comprising a portion (303) for the exchange of heat with said exhaust gases and with said first heat exchange length of said refrigeration means.

15. The transport vehicle according to claim 14, wherein said refrigeration device (302) comprise at least one Peltier cell.

16. The transport vehicle according to claim 13, further comprising an air conditioning device inside the passenger compartment, said cooling means (3) of said purification system (1) being functionally connected to said air conditioning device.

17. The system according to claim 5, wherein characterized in that said separating means (4) comprise at least one centrifuge (50) of the conical type.

18. The system according to claim 17, wherein said separating means (4) comprise at least one centrifuge (50) of the two-stage type.

* * * * *